US006879684B1

(12) United States Patent
Adli

(10) Patent No.: US 6,879,684 B1
(45) Date of Patent: Apr. 12, 2005

(54) METHOD OF TRANSMITTING DATA TO MEMBERS OF AN OPERATOR SERVICE

(75) Inventor: Wahid Adli, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/937,877

(22) PCT Filed: Mar. 31, 2000

(86) PCT No.: PCT/DE00/00979

§ 371 (c)(1),
(2), (4) Date: Jan. 7, 2002

(87) PCT Pub. No.: WO00/60880

PCT Pub. Date: Oct. 12, 2000

(30) Foreign Application Priority Data

Mar. 31, 1999 (DE) .......................... 199 14 795
Apr. 15, 1999 (DE) .......................... 199 17 077

(51) Int. Cl.⁷ .............................................. H04M 3/00
(52) U.S. Cl. ............................ 379/265.04; 379/265.09; 379/266.09
(58) Field of Search ................................ 379/229, 230, 379/265.02, 265.03, 265.04, 265.05, 265.09, 266.09

(56) References Cited

U.S. PATENT DOCUMENTS

| | | | |
|---|---|---|---|
| 4,406,925 A | | 9/1983 | Jordan et al. |
| 5,012,512 A | | 4/1991 | Basso et al. |
| 5,392,345 A | * | 2/1995 | Otto ...................... 379/266.09 |
| 5,459,780 A | * | 10/1995 | Sand ..................... 379/266.09 |
| 5,469,504 A | | 11/1995 | Blaha |
| 5,712,907 A | | 1/1998 | Wegner et al. |
| 6,049,602 A | * | 4/2000 | Foladare et al. ........ 379/265.04 |
| 6,130,935 A | * | 10/2000 | Shaffer et al. ......... 379/127.03 |
| 6,175,564 B1 | * | 1/2001 | Miloslavsky et al. ....... 370/352 |
| 6,366,667 B1 | * | 4/2002 | Palacios et al. ........ 379/266.02 |

FOREIGN PATENT DOCUMENTS

| | | |
|---|---|---|
| DE | 19724122 A1 | 12/1998 |
| DE | 197 24 122 | 12/1998 |
| DE | 19739016 A1 | 3/1999 |
| DE | 197 39 016 | 3/1999 |
| GB | 2 327 172 | 1/1999 |
| WO | WO 96/42163 | 12/1996 |
| WO | WO 97/50226 | 12/1997 |
| WO | WO 98/18270 | 4/1998 |

OTHER PUBLICATIONS

Chan, et al., Merian 1 Global corporate networking with ISDN, No. 93 (1991) pps. 27–35, XP 000244592.
Bocker, et al., Die Aufgabe der Kommunikationsnetze, (1997), pps. 1–12, 83–97, 179–186, 197–215, 239–247; XP 002089234.
Chan, "Meridian 1 Global Corporate Networking with ISDN". Telesis 1991 No. 93, pp. 27–35.
Bocker et al., "ISDN Digitale Nete fur Sprach, Text–, Daten–, Video– und Multimediakommunikation" 1997, pp. 1–12, 83–97, –247 XP–002089234.
Chan, "Meridian 1 Global Corporate Networking with ISDN". Telesis 1991 No. 93, pp. 27–35.
Bocker et al., "ISDN Digitale Nete fur Sprach, Text–, Daten–, Video– und Multimediakommunikation" 1997, pp. 1–12, 83–97, –247 XP–002089234.

* cited by examiner

*Primary Examiner*—Bing Q. Bui
(74) *Attorney, Agent, or Firm*—Bell Boyd & Lloyd LLC

(57) ABSTRACT

A method for managing operators of an operator service, the network having switching offices in which the operator logs on to a central master office by virtue of the fact that the operator initiates a call linked to a virtual operator in the master office using a call number table, the request for remote logging on is transmitted from the home switching office to the master office by means of inter-office signaling after the call link has been set up, and that data which is specific to the operator service is then transmitted from the coordination processor and/or a peripheral line trunk group of the master office to the operator and loaded into its terminal.

7 Claims, 1 Drawing Sheet

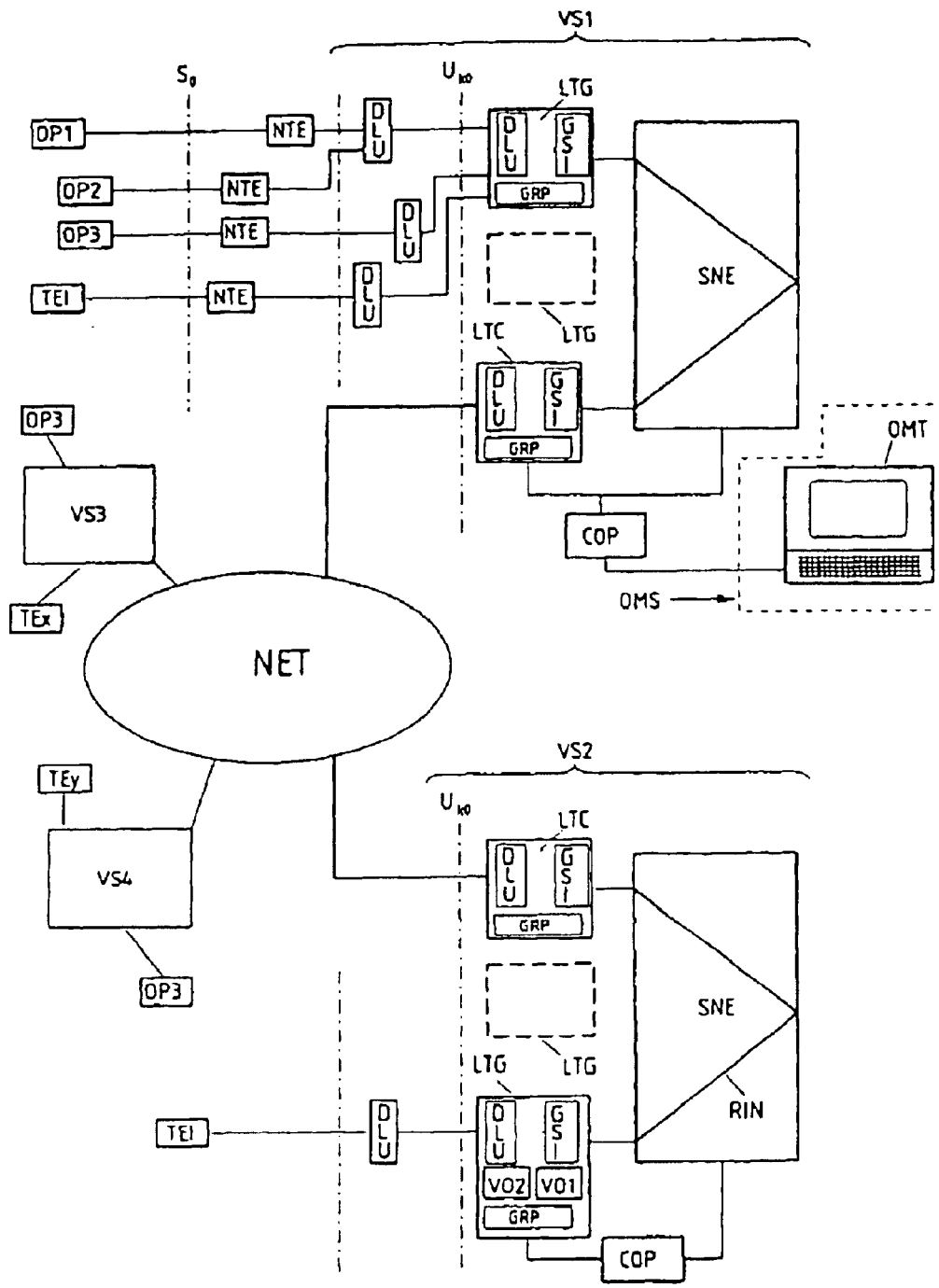

METHOD OF TRANSMITTING DATA TO MEMBERS OF AN OPERATOR SERVICE

BACKGROUND OF THE INVENTION

The present invention relates to a method for managing operators of a telecommunications network which are members of an operator service; the telecommunications network having switching offices and after an operator has logged on to its home switching office in a data channel, the operator logs on to the peripheral line trunk group (LTG) of the operator via the data channel.

Operator services which constitute an essential link between the customers of the network and the network operators are required in telephone networks. Such an operator service has diverse functions, one function can be to distribute information to subscribers on request. For example, a subscriber may call an operator service in an ISDN network and request information. The respective operator can then, if necessary, access a database, in which case information relating to another subscriber is then provided the operator on the screen of a PC. After a connection request by the operator, which can be effected by pressing a push-button key, the operator is connected to the searched-for subscriber. The operator is then connected back to the originating subscriber and to the searched-for subscriber and can optionally speak to one of the subscribers. Signaling on the D channel then takes place again at the push of a further push-button key, and the connection situations of the two subscribers of the peripheral line connecting group are indicated. The call channels are then connected via the switching matrix so that ultimately there is a direct link between the two subscribers. The example described here represents just one of the possibilities or functions of an operator service.

Large networks for a large number of subscribers require a correspondingly large number of operator service systems with a large number of generally hierarchically structured system subscribers (operators), for example, the Applicant's system which is called ADMOSS. Messages from the operators to the switching office are sent, as previously mentioned, via the D channel in an ISDN network, specifically in a point-to-point configuration with a permanently active layer 2 of the OSI layer model. The messages are transmitted in an ISDN network with the support of the D channel protocol, for which reason, reference is made to the Blue Book, Volume VI—Fascicle VI. 11, "Digital Subscribe Signaling System No. 1 (DSS1), Network Layer, User-Network Management," Recommendations Q. 930–Q. 940, in particular to recommendation Q. 931.

The operators are generally located in call centers, and a respective device, which can be a terminal, PC, screen etc. and referred to as "Console", is directly connected to the system and/or can be connected to the local switching office. However, the need to use decentralized operators, for example, within the context of homework, is being increasingly felt, but a single central management system for the operators in the network should still be possible.

Similar issues relating to operators are also described in U.S. Pat. No. 5,012,512. The solution described in the present invention to shorten the time expended is not only capable of displaying and processing the requested data of a subscriber on the screen of the operator, but also data which the operator obtained on request from one or more databases.

U.S. Pat. No. 5,469,504 describes a call distributor system having a host computer together with a database which is physically connected to all the switching offices, and serves as a system for switching the data between the individual switching offices to which operators of an operator service are connected. In the system, a call link is first offered to an operator via the local switching office, if the operator is not suitably located for this call, this call is transferred to a further operator using the host computer, this transfer being made using a special protocol, referred to as "intertandem protocol." This protocol uses a DTMF method. The expenditure incurred as a result of the use of the host computer in conjunction with the X.25 interface protocol, described in U.S. Pat. No. 5,469,504, and the intertandem protocol is, however, considered to be disadvantageous.

SUMMARY OF THE INVENTION

An advantage of the present invention is that it permits network-wide management of all the operators or consoles of the operator system. For example, a central switching office, referred to as master office, would have information indicating which operators are free or busy or out of service so that an inquiry of a network subscriber relating to a telephone number, address, etc., can quickly be passed on to an operator at a remote switching office. If no operator at the local switching office is available. This, thus, permits network-wide call distribution in terms of the operators.

This advantage is achieved by the present invention. In the present invention, after successful logging on, a request for remote logging on to a central master office is transmitted, a call number or call number table of virtual operators located in the master office is transmitted from the peripheral line trunk group to the operator, the operator initiates a voice link to a virtual operator using the call number or call number table, and, after the call link has been successfully set up, the request for remote logging on is transmitted from the home switching office to the master office via inter-office signaling, and is conveyed in the master office to its coordination processor. Log on confirmation data and data which is specific to the operator service is then loaded from the coordination processor and/or a peripheral line trunk group of the master office into the peripheral line trunk group of the operator in the home switching office and from there into the operator's terminal, and a status report of the operator is transmitted via a data channel to the peripheral line trunk group of the home switching office and from there via inter-office signaling to the coordination processor of the master office.

Because of the present invention, an operator system which operates on a network-wide basis and managed centrally can be provided. The present invention is more expedient because it provides a saving in resources if the local logging on to the home switching office is terminated after the remote logging on of the operator to the master office.

In order to facilitate the operator work, there is a provision that the status report is not output until the expiration of a protection time which follows the successful remote logging on.

It is expedient if the data to be transmitted is transmitted from the peripheral line trunk group of the master office to the operator via a data channel other than the voice channel, this constituting the customary possibility for the transmission of data, which is also provided in the network in accordance with regulations.

Because a voice link is set up in accordance with the present invention, it may also be expedient if data is transmitted via a voice channel set up between the operator and a virtual operator using a data link program.

The present invention is particularly suitable for application in an ISDN network, the data channel being the D channel, and the voice channels being B channels.

Additional features and advantages of the present invention are described in, and will be apparent from, the following Detailed Description of the Invention and the Figures.

BRIEF DESCRIPTION OF THE FIGURES

FIG. 1 shows the basic structure of a network with two switching offices and an operator service.

DETAILED DESCRIPTION OF THE INVENTION

At the top left of FIG. 1 there are a number of subscribers OP1, OP2 . . . of an operator service OPS, details of the hierarchy within the operators OP1, OP2 . . . are not being given here. All the operators OP1, OP2 . . . , are connected into the network together with customary network subscribers TEI of a telecommunications network NET. The network in the present case is an ISDN network and the connection is made via an $S_0$ interface, i.e., in each case to a network terminal NTE.

The first switching office, VS1, of the network is shown top right and it has, in a manner known per se, a switching matrix, SNE, and periphery line trunk groups LTG, LTC connected thereto. A coordination processor, COP, is provided for controlling the switching office VS1, including the switching matrix SNE. Each peripheral line trunk group LTG, LTC also contains, in a known manner, a group processor GRP, and in this embodiment concentrators DLU (Digital Line Unit) are connected to each peripheral line trunk group via a $U_{k0}$ interface. Each of these concentrators DLU have inputs for the network terminals already mentioned above. In the case of relatively large switching offices, up to 512 peripheral line trunk groups LTG, LTC can be connected to a switching matrix SNE, and usually two concentrators DLU are connected to each line trunk group LTG. The peripheral line trunk groups LTG, LTC each also contain, in a known manner, a group switch GSI.

In a peripheral line trunk group LTG, LTC, various programs are executed which are supported by the group processor GRP, for example, the greater part of the connection setup, the signaling, the code reception etc., takes place here. In general, 70% of the connection setup is carried out in the peripheral line trunk groups, whereas routing functions are assigned to the coordination processor COP.

The switching office can also include an operation and maintenance system OMS with an operation and maintenance terminal OMT at which monitoring personnel can continuously monitor the state of the switching office and detect faults.

The operators OP1, OP2 . . . of the operator service usually have workstations with personal computers which contain ISDN cards and special software as well as headsets for the operators. The terminals of the operators are also called "consoles" in the following. The operators OP1, OP2, . . . can transmit messages to the switching office, including the peripheral line trunk groups LTG. These messages are processed in the group processor GRP and lead to further corresponding measures, for example a connection setup. The messages are transmitted in a point-to-point configuration with a permanently active layer 2 and in the D channel in an ISDN network.

Bottom right in FIG. 1 there is a further switching office VS2 which is associated with the network NET and whose structure corresponds basically to the first switching office VS1, but the second switching office VS2 serves as a master office of the operator service. It can be appreciated that a large number of other switching offices (not shown here) may also be provided as a function of the size of the network, as indicated in FIG. 1 by two boxes VS3, VS4.

Each of these switching offices can be assigned operators $OP_x$, $OP_y$, again.

Each switching office VS1, VS2, . . . has a particular peripheral line trunk group LTC for fast data links which permit data exchange within the scope of inter-office signaling, for example in the ISUP signaling system (see P. Bocker, ISDN Digitale Netze für Sprach, Text, Daten, Video and Multimediakommunikation ("digital Networks for Call, Text, Data, Video and Multimedia communication"), 4th Edition, Springer (Publishing house), Section 6.2.9, "Zwischenamtsignalisierung" ("Inter-office signaling"), with other such line trunk groups via rapid data links, for example optical fiber lines.

In the present invention, any operator OP1, OP2, . . . can log on to a remote office, here the master office VS2. The present invention provides a method which is described below in more detail.

An operator OP1 first logs on to his home switching office VS1 by using a password and an ID number which corresponds to the prior art. After successful logging on, the console of the operator OP1 transmits a request for remote logging on in the master office VS2 to the associated peripheral line trunk group LTG of the home switching office VS1 in the D channel via a data link. This request then causes a call number or a call number table of virtual operators VO1, V02 to be transmitted to the console of the operator OP1.

Such virtual operators are configured in at least one peripheral line trunk group LTG of the master office VS2, and are required to be able to set up an actual call link.

The console of the operator OP1 then uses the call number or one of the possible call numbers in order to set up a call link, i.e., a link in a B channel to a virtual operator VO1. After successful setting up of this link, the request for remote logging is transmitted via inter-office signaling from the switching office of the operator OP1 to the master office VS2 and conveyed to the coordination processor COP in the master office VS2. In the next step, "log on response" data and call number data (for example, system clock time and date, the hierarchical structure, personal data and different rights, i.e., access possibilities to statistical data, etc.) are loaded from the coordination processor COP and/or a peripheral line trunk group LTG of the master office VS2 into the peripheral line trunk group LTG of the operator OP1 in the home switching office VS1, or from here into the operator console. This can be carried out via a data channel (D channel) or via the existing call link in a B channel using a data link program. After determination of this data transmission, the "log-off" is initiated with respect to the "local" log on between the operator OP1 and home switching office VS1.

However, if the voice link has not been established in the B channel between the operator console and the virtual operator VOP, the next call number of a virtual operator is obtained from the aforesaid call number table by the console and a new link attempt is started.

After a successful log on in the master office VS2 takes place, soon after a certain protection time has expired which is implemented via a post-call timer, a status message (operator status message), in this case "idle" is transmitted from the console of the operator OP1 via a data channel link to the peripheral line trunk group LTG of the home switching office VS1. From here, the status message (here "idle") is transmitted to the master office VS2 using inter-office signaling, for example, ISUP, and transmitted to the coordination processor COP. The aforesaid protection time of, for example, 20 to 60s, permits the line of the operator OP1 to appear seized or busy and is intended to prevent the operator OP1 from being "overloaded" by an enquiry virtually simultaneously with its log on.

Status changes of the operator OP1, such as, from "idle" to "busy", are handled in the same way and are therefore known in the master office VS2.

The present invention makes possible a network-wide operator service system in which operators of remote offices can be integrated into the work of this system by virtue of the central management of the system carried out at an office (switching office).

Although the present invention has been described with reference to specific embodiments, those of skill in the art will recognize that changes may be made thereto without departing from the spirit and scope of the invention as set forth in the hereafter appended claims.

What is claimed is:

1. A method for managing operators of a telecommunications network, the operators being members of an operator service and the network having a plurality of switching offices, the method comprising the steps of:

logging on to a home switching office via a data channel by an operator;

logging on to a peripheral line trunk group via the data channel by the operator;

transmitting, after successfully logging on, a request for remote logging on to a central master office;

transmitting a call number or a call number table of virtual operators located in the central master office from the peripheral line trunk group to the operator;

initiating a voice link to one of the virtual operators, by the operator, using the call number or the call number table;

transmitting the request for remote logging on from the home switching office to the master office via inter-office signaling, after the voice link has been successfully set up;

conveying the request for remote logging on, in the master office, to a coordination processor;

loading from at least one of the coordination processors and the peripheral line group of the master office, the log on confirmation data and data which is specific to the operator service, into the peripheral line trunk group of the operator in the home switching office;

loading the log on confirmation data and the data which is specific to the operator service to the operator's terminal from the peripheral line trunk group of the operator in the home switching office;

transmitting, via a data channel, a status report of the operator to the peripheral line trunk group of the home switching office; and transmitting the status report of the operator to the coordination processor of the master office from the peripheral line trunk group of the home switching office via inter-office signaling.

2. A method for managing operators of a telecommunications network as claimed in claim 1, the method further comprising the step of:

terminating local logging on to the home switching office after the remote logging on of the operator to the master office.

3. A method for managing operators of a telecommunications network as claimed in claim 1, wherein the status report is not output until after a protection time following the remote logging on has expired.

4. A method for managing operators of a telecommunications network as claimed in claim 1, wherein data to be transmitted is transmitted from the peripheral line trunk group of the master office to the operator via a channel other than a voice channel.

5. A method for managing operators of a telecommunications network as claimed in claim 1, wherein data to be transmitted is transmitted via a voice channel set up between the operator and one of the virtual operators using a data link program.

6. A method for managing operators of a telecommunications network as claimed in claim 1, wherein the communications network is an ISDN network, the data channel is a D channel and voice channels are B channels.

7. A method for managing operators of a telecommunications network as claimed in claim 1, wherein the inter-office signaling system is an ISUP signaling system.

* * * * *